US008330981B2

(12) United States Patent
Ishizaki

(10) Patent No.: US 8,330,981 B2
(45) Date of Patent: Dec. 11, 2012

(54) IMAGE PROCESSING APPARATUS AND IMAGE PROCESSING METHOD

(75) Inventor: Koji Ishizaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 625 days.

(21) Appl. No.: 12/379,738

(22) Filed: Feb. 27, 2009

(65) Prior Publication Data

US 2009/0219567 A1    Sep. 3, 2009

(30) Foreign Application Priority Data

Feb. 29, 2008  (JP) ................................. 2008-051272

(51) Int. Cl.
G06F 3/12    (2006.01)
(52) U.S. Cl. ........ 358/1.15; 358/1.9; 358/474; 382/181; 382/219; 705/8
(58) Field of Classification Search ................ 358/1.14, 358/1.15, 1.12, 1.9, 474; 382/100, 219, 181
See application file for complete search history.

(56) References Cited

U.S. PATENT DOCUMENTS

| 5,692,073 A * | 11/1997 | Cass ............................. 382/219 |
| 2006/0218188 A1* | 9/2006 | Duncan et al. ............. 707/104.1 |
| 2008/0183536 A1* | 7/2008 | Hirabayashi ...................... 705/8 |

FOREIGN PATENT DOCUMENTS

| JP | 6-139419 | 5/1994 |
| JP | 2001-184453 | 7/2001 |
| JP | 2004-179780 | 6/2004 |
| JP | 2005-210563 | 8/2005 |
| JP | 2005210563 A * | 8/2005 |
| JP | 2006-126941 | 5/2006 |
| JP | 2008-22143 | 1/2008 |

* cited by examiner

Primary Examiner — Benny Q Tieu
Assistant Examiner — Moustapha Diaby
(74) Attorney, Agent, or Firm — Rabin & Berdo, P.C.

(57) ABSTRACT

An image processing apparatus for receiving a plurality of images, saving the plurality of images, and executing image processing includes an identifying unit for identifying a first image and a second image from the plurality of the images, an image recognizing unit for recognizing information on the second image from the first image, and a processing setting unit for setting processing for the second image based on recognition at the image recognition unit, wherein the images are processed based on the setting set at the processing setting unit, thereby automatically processing documents of plural types and greatly reducing work loads on the operator such as operator's setting paper and instructing start operation.

16 Claims, 17 Drawing Sheets

FIG. 2

FORM 1

◯◯◯◯ APPLICATION

| APPLICATION DATE | |
|---|---|

| NAME | | SEX | M | F |
|---|---|---|---|---|

| ADDRESS | |
|---|---|

| BIRTHDAY | | AGE | |
|---|---|---|---|

PLEASE CHECK APPLICATION SECTION YOU REQUEST

| APPLICATION SECTION | ☐ A ☐ B ☐ C |
|---|---|

211

ABC00123

220

FORM 2

◯◯◯◯ APPLICATION
APPENDIX FORM 2

| APPLICATION SECTION | A |
|---|---|

APPLICATION CONTENTS
SENT TO INSURANCE COMPANY

| INSURANCE NUMBER | |
|---|---|
| INSURED PERSON | |

ABC00123

220

FORM 3

◯◯◯◯ APPLICATION
APPENDIX FORM 3

| APPLICATION SECTION | B |
|---|---|

APPLICATION CONTENTS
FOR CREDIT CARD COMPANY

| NUMBER | |
|---|---|
| CREDITED PERSON | |
| EXPIRED | |

ABC00123

220

FORM 4

◯◯◯◯ APPLICATION
APPENDIX FORM 4

| APPLICATION SECTION | C |
|---|---|

FOR MUNICIPALITY SUBMISSION

ABC00123

FORM 1

○○○○ APPLICATION

| | APPLICATION DATE | | |
|---|---|---|---|
| NAME | | SEX | M  F |
| ADDRESS | | | |
| BIRTHDAY | | AGE | |

PLEASE CHECK APPLICATION SECTION YOU REQUEST

| APPLICATION SECTION | ☐A | ☐B | ☐C |

~301  ~302  ~303

ABC00123

~310

FORM 2

○○○○ APPLICATION APPENDIX FORM 2

| APPLICATION SECTION | A |
|---|---|

APPLICATION CONTENTS SENT TO INSURANCE COMPANY

| INSURANCE NUMBER | |
|---|---|
| INSURED PERSON | |

ABC00123

~310

FORM 3

○○○○ APPLICATION APPENDIX FORM 3

| APPLICATION SECTION | B |
|---|---|

APPLICATION CONTENTS FOR CREDIT CARD COMPANY

| NUMBER | |
|---|---|
| CREDITED PERSON | |
| EXPIRED | |

ABC00123

~310

FORM 4

○○○○ APPLICATION APPENDIX FORM 4

| APPLICATION SECTION | C |
|---|---|

FOR MUNICIPALITY SUBMISSION

ABC00123

FORM 5

△△△△ REQUEST

ABC00123 — 801

| SECTION | SALES #1 | NAME | JOHN DOE |
|---|---|---|---|
| EMPLOYEE NUMBER | 1234567 | | |

802

NOTE

FIG. 12

FORM 7

△△△△ REQUEST — 905

| SECTION | SALES #1 | NAME | JOHN DOE |

| EMPLOYEE NUMBER | 1234567 |

NOTE

IMAGE PROCESSING APPARATUS AND IMAGE PROCESSING METHOD

BACKGROUND OF THE INVENTION

1. Field of the Invention

This invention relates to an image processing apparatus for processing images read via a scanner or the like and to an image processing method using the image processing apparatus.

2. Description of Related Art

Document management systems have been known as a system for processing images inputted from such as a scanner as electronic document data, for saving the data in a hard disc, and for efficiently filing and storing various document data including those inputted document data. In a general document management system, the system has a function to search the stored documents with key words upon setting such key words for searches to the documents when the documents are recorded in the document management system and a function to execute processing steps so called as workflow at a time recording the documents with respect to recorded documents according to the types or information of stored directories (see, e.g., Japanese patent unexamined publication No. 2006-126941).

As such a workflow, a process has been widely known in which an email setting forth instructions or information for manager's confirmation or permission is sent to the manager at a time that a user makes recording of a document and then a manipulation is made for rendering the manager confirm the document that the subordinate wants to record and allow the recording. Such a system may have a function to set an attribute of security to the documents when recording the documents in the document management system to allow a disclosure limited to specific users, and a function to add a signature or encryption to prevent documents from being divulged or falsified.

With such a conventional document management system, the workflow is executed for each form although the recorded workflow is to be executed upon automatically recognizing images inputted from a scanner and managing the images with classifying the images for respective forms. For example, for a document whose one set is constituted of plural pages, the workflow according to the first recognized form is executed, or the respective workflow is executed for each form. In a situation for processing a document whose one set is constituted of plural pages, there raises a problem on occurrences of human errors without obtaining intended results in a case that a user wants to do a different workflow according to contents of the second or following page where information of the document contained in the second or following page is designated at the first page, thereby causing impaired work efficiency and understanding error of the document.

It is therefore an object of the invention to provide an image processing apparatus realizing flexible document management able to reflect a process to a prescribed page to other processes in a case where a workflow is executed along plural pages and to provide an image processing method using such an image processing apparatus.

SUMMARY OF THE INVENTION

To accomplish the foregoing objects, an image processing apparatus according to the invention is an apparatus for receiving a plurality of images, preserving the plurality of images, and executing image processing, including: an identifying unit for identifying a first image and a second image from the plurality of the images; an image recognizing unit for recognizing information on the second image from the first image; and a processing setting unit for setting processing for the second image based on recognition at the image recognition unit, wherein the images are processed based on the setting set at the processing setting unit.

In other aspect of the invention, an image processing method is provided for receiving, preserving, and processing plural images, and includes the steps of: identifying a first image and a second image among the plural images; recognizing information regarding the second image from the first image; setting a processing for the second image based on recognition made at the recognizing step; and processing the images based on the setting set at the setting step.

When form groups having combinations of arbitrary forms are processed using the image processing apparatus according to the invention, documents of plural types can automatically be processed, thereby greatly reducing work loads on the operator such as operator's setting paper and instructing start. Because the second image processing is set based on the recognition of the image recognizing unit, the kind of the forms can be recognized automatically, thereby reducing loads on manipulations designating a form type at an instruction for start and reducing mistakes on designating a form type. In addition, where lack of pages in a form group having plural sheets as one set is recognized, errors in human being's confirmation can be reduced by displaying a warning to the operator.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 2 is a schematic diagram showing an example of a sampling document for extracting a feature of form used for the image processing apparatus according to the first embodiment of the invention;

FIG. 3 is an illustration showing examples of region recognition information for the image processing apparatus according to the first embodiment of the invention;

FIG. 10 is an illustration exemplifying a document indicating request contents in an image processing apparatus according to a second embodiment of the invention;

FIG. 12 is an illustration showing an example of a document embedding a form type ID and the like in a background pattern in the image processing apparatus according to the second embodiment of the invention;

DETAILED DESCRIPTION OF PREFERRED EMBODIMENTS

First Embodiment

An image processing apparatus according to this embodiment can read documents in a form group constituted of forms in plural types, can recognize each document according to a mark or indicia set forth in, e.g., a first page, and can execute appropriate workflows according to the documents. A system structure is described herein in which a scanner of a multi-function peripheral (MFP) reads documents and in which read images are processed at a server connected via a network to execute the workflow.

Figure 1:
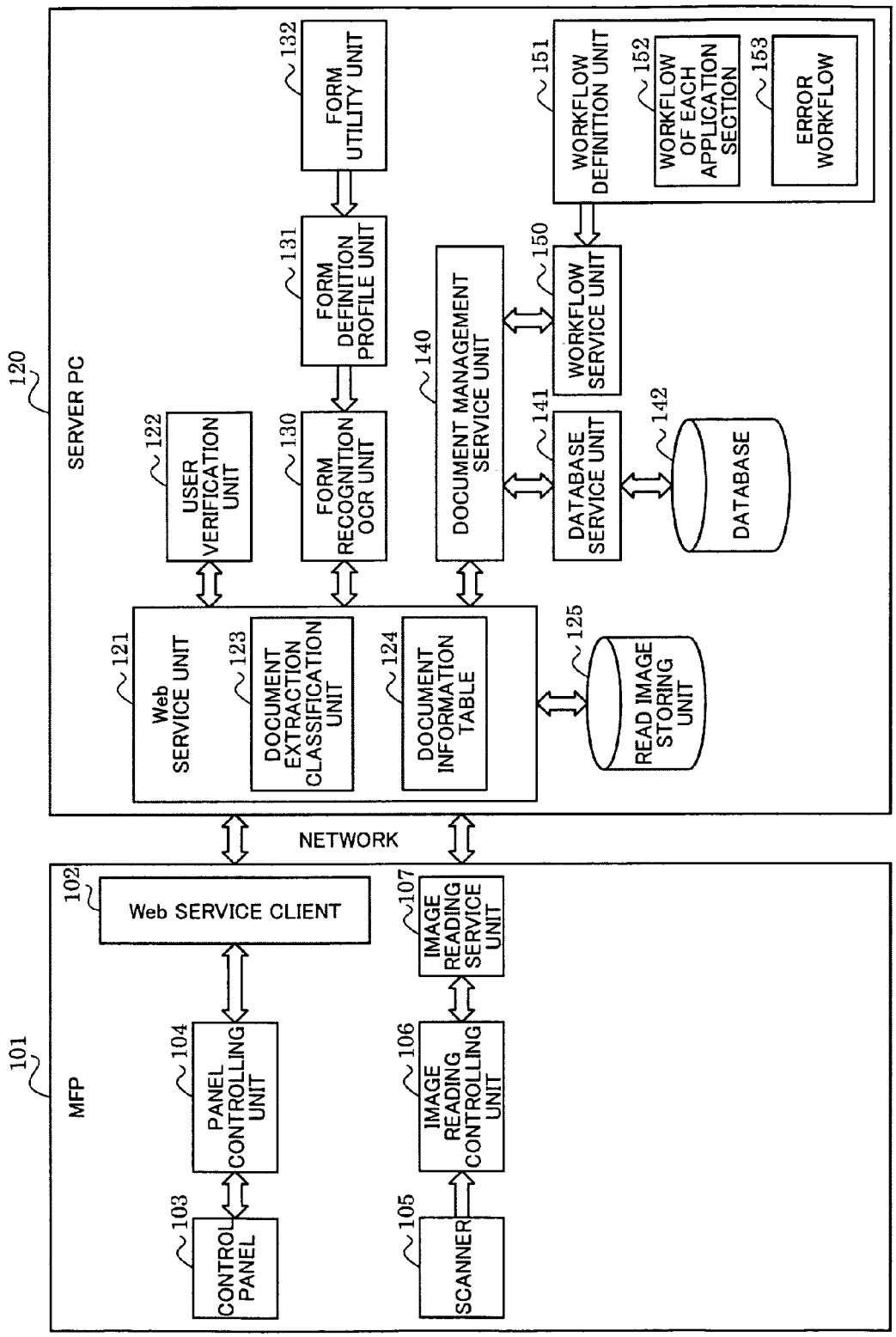
FIG. 1 is a block diagram showing a structure of an image processing apparatus according to a first embodiment of the invention.

The system formed of an image processing apparatus according to this embodiment, as shown in FIG. 1, includes a multi-function peripheral 101 connected via the network such as a LAN or the Internet, and a server PC (personal computer) 120 functioning as an image processing apparatus.

The multi-function peripheral 101 includes a web service client 102 transmitting to the server PC 120 information in association with MFP user's manipulation instructions via an SOAP communication using a http protocol with the network-connected server PC 120 and receiving processing results of the server PC 120, a control panel 103 displaying, e.g., the states of the multi-function peripheral and usable functions and receiving user's manipulation instructions, a panel controlling unit 104 informing manipulation instructions entered at the control panel 103 to the web service client 102 and displaying the processing results of the server PC 120 at the control panel 103, a scanner 105 picking up or reading loaded texts and documents as images, an image reading controlling unit 106 for controlling image reading done at the scanner 105, and an image reading service unit 107 for receiving an instruction for reading a text from the server PC 120, reading the document image through the scanner 105 via the image reading controlling unit 106, and sending the data to the server PC 120. It is to be noted that the multi-function peripheral 101 has printing and facsimile functions, but units relating to those functions are not illustrated because not used in this embodiment. The scanner 105 is installed with an automatic document feeder capable of scanning documents having a plural number of pages. With this embodiment, the image data are entered with the scanner 105, but as a modification, image data produced at other external apparatuses, e.g., personal computers, can be entered.

Figure 15:
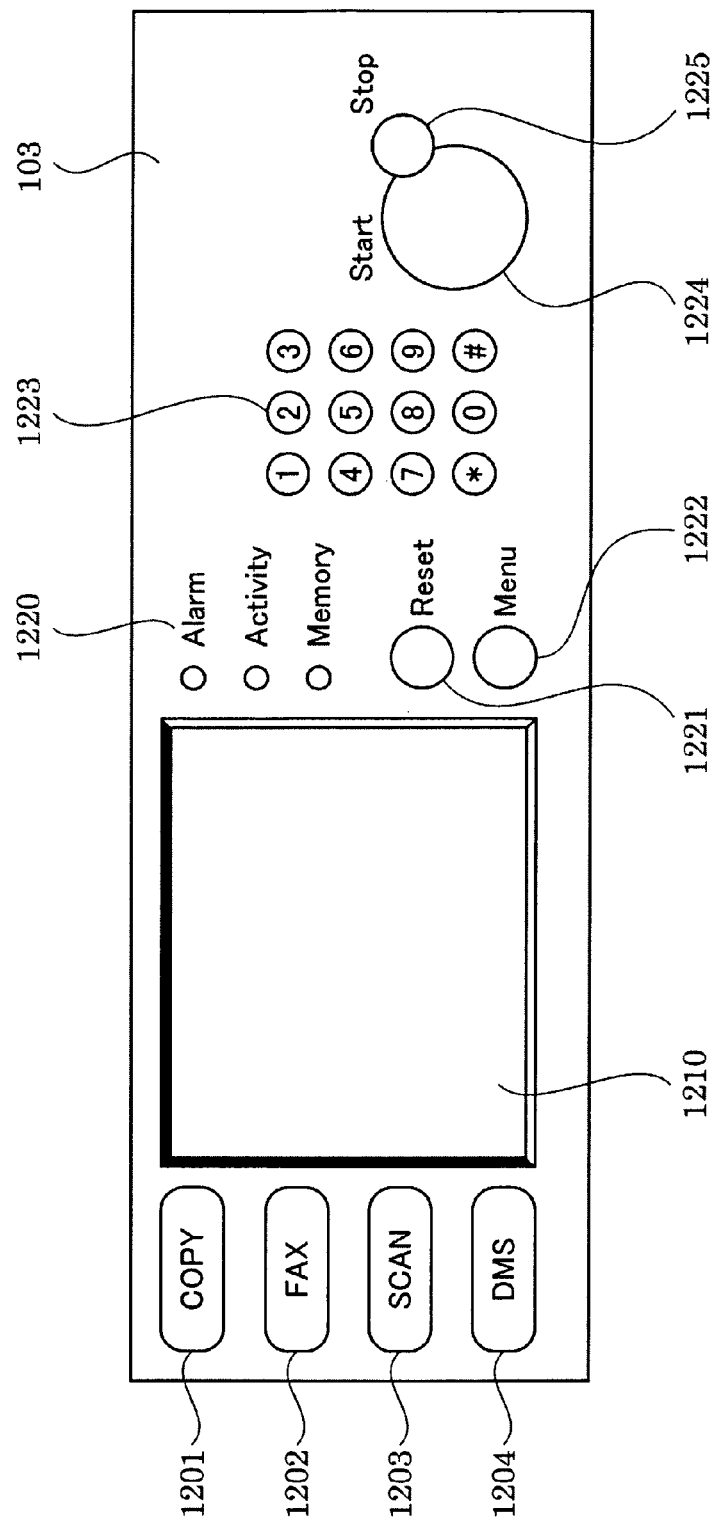
FIG. 15 is an illustration showing a structural example of a control panel of the image processing apparatus according to the first embodiment of the invention.

FIG. 15 shows a structural example of the control panel 103 of the multi-function peripheral 101. The control panel 103 includes a copy key 1201, a facsimile key 1202, a scan key 1203, a DMS key 1204, for selecting functions of the multi-function peripheral, a liquid crystal touch panel 1210 for displaying details of manipulations of the selected function for displaying manipulations designated by user's touching the screen with respect to the manipulation, and for user's designating the manipulation, a state displaying LED 1220 indicating briefly the state of the multi-function peripheral, a reset key 1221 for returning back entire manipulations during operation to the initial state, a menu key 1222 for displaying a setting menu of the multi-function peripheral, a ten key 1223 for entering letters during the manipulations, a start key 1224 for designating operation start, and a stop key for ceasing the operation.

The server PC 120 includes a web service unit 121 for reviving information in association with MFP user's manipulation instructions via an SOAP communication using a http protocol with the network-connected multi-function peripheral 101 and for making processing according to the instructions, a user verification unit 122 for verifying as to whether the user of the multi-function peripheral 101 is a user permitted to use the system at a time of the operation start, a read image storing unit 125 for storing read images out of the image reading service unit 107 in the multi-function peripheral 101, a form definition utility unit 132 for extracting a feature of the image in one page and storing in a form definition profile 131 data relating between an attribute for recognizing the form as the feature of the form and an attribute for recognizing rectangles and rectangular regions to be recognized for letters and marks or indicia in a page, a form recognition OCR unit 130 for extracting features in an image of one page portion cut away from a document image read out of the multi-function peripheral 101, for recognizing a form from the feature of the form defined in advance in the form definition profile 131, and for recognizing the letters and the marks or indicia from images in the rectangular images for recognizing the letters and the marks or indicia in relation to the recognized form, a document management service unit 140 for relating the document image read from the multi-function peripheral 101 with results recognized at the form recognition OCR unit 130 and for storing data in a database 142 via a database service unit 140, a workflow service unit 150 for executing workflow such as allowance processing relating to the type of the document saved at the document management service unit 140, and a workflow definition unit 151 defining processing steps done at the workflow.

The web service unit 121 includes a document extraction classification unit 123 for extracting one document from image files stored in the read image storing unit 125, and a document information table 124 for saving information of the document extracted at the document extraction classification unit 123. Conventionally known arts based on feature on lines can be used as technology relating the form recognition OCR unit 130 extracting features of the images in one page to recognize the form from the feature of the form and to recognize the letters and marks or indicia from the rectangular image for recognizing the letters and marks or indicia relating to the recognized forms. For example, such an art is to automatically extract and make recognition on features of the lines in the entire form, and does not require any manipulation that needs special skill such as defining the location of the feature or specifically defining such features. The workflow definition unit 151 stores a workflow 152 of each application section serving as a workflow during a normal processing, and a workflow 153 for error serving as a workflow during error processing.

The image processing apparatus according to this embodiment having the structure as shown in FIG. 1 is described with exemplifying an application shown in FIG. 2. FIG. 2 shows a form of a document having a plural number of pages, and the sheet of Form 1 is defined as the first page. A column 211 of the application section in the page of Form 1 is provided for requesting an entry of the application section, and an applicant fills a check box or boxes of the applied section in hand writing, or namely enters a check mark in any or all of Forms 2 to 4 of necessary Form or Forms of second or following page(s) according to the checked contents. Each form is different from other Form, and contents to be entered are different among Forms. A sheet of Form designed at the column 211 of the application section of Form 1 is attached to the second or later page, and the form group including the attached sheets makes one document. That is, the application shown in FIG. 2 constitutes a form group in which four Forms are arbitrarily combined, and the combination may vary depending on the application section 211.

In this embodiment, identification numbers for respective documents are used, but the identification number is a unique string assigned to each form group. That is, a form group made of image data read continuously at one time constitutes one set, and the one set includes plural Forms. The form group can be recognized with the ID number (e.g., ABC00123) set forth in an identification column 220 for document identification in FIG. 2 as to make processing possible even where the one Form is dispersedly provided, thereby extracting a particular one document among the sets of the form groups made of the read images randomly located. A document not set forth in the identification column 220 can be handled as one document not having the identification number. In this embodiment, the pages of each Form appear in a way that one Form is constituted of one page (one sheet); the page of each of Forms contained in one document is active for only one page; only the first extracted page is active in a case where plural pages of one Form in one document exist. With the form grope shown in FIG. 2, an application is filled to an application requesting management department of an insurance company if the box A is designated as the application section 221, and is filled to an application management department of a credit card company or to a municipality submission management department in a case where the box B or C is designated, respectively, as the application section 221.

In operation of the image processing apparatus according to the embodiment, the following works are to be done at the server PC prior to use by users. First, at the form definition utility unit 132, features of a document with blanked contents as a basis of forms recognized at the time of operation shown in FIG. 2 are extracted for each page of the respective Forms. Data are saved in the form definition profile 131, in association with the name of the form and the attributes for recognition of the form, by defining, as region recognition information, the attributes for recognizing the region for check marks, or namely, rectangular check boxes 301, 302, 303 in a region for check marks in the application sections as shown in FIG. 3 with respect to the form of Form 1, and by defining, as a region recognition information, the attributes for recognizing, as the document identification number, the rectangular region 310 shown in the recognition region for retrieving a document identification number in all of Forms 1 to 4. The images for defining the forms can be read from the multi-function peripheral 101 manually.

Subsequently, a document library is produced for saving documents in use of the document management service unit 140 in advance. The document library to be produced is four types: i) for application section A, ii) for application section B, iii) for application section C, and vi) for error. Actual data in the document library are stored in the database 142 via the database service unit 141.

Workflows according to the application sections are in advance defined at the workflow defining unit 151. In this embodiment, the following workflows are defined and saved in the workflow definition unit 151 in association with the document library of the application sections. The defined workflows are four workflows: i) workflow for application section A, ii) workflow for application section B, iii) workflow for application section C, and vi) workflow for error. The workflow for application section A is to file an application as the document to the application requesting management department of the insurance company after approval by the operator's supervisor and to inform the completion of the operator as the requester upon completion of the application. Necessary documents for application of the workflow A for application section A are Form 1 and Form 2. The workflow for application section B is to file an application as the document to the application requesting management department of the credit card company after approval by the operator's supervisor and to inform the completion of the operator as the requestor upon completion of the application. Necessary documents for application of the workflow B for application section B are Form 1 and Form 3.

The workflow for application section C is to file an application as the document to the municipality submission management department after approval by the operator's supervisor and to inform the completion of the operator as the requestor upon completion of the application. Necessary documents for application of the workflow C for application section C are Form 1 and Form 4. Finally, with the error workflow D, a correspondence that the filing processing could not be done to sent to the operator. The user has to be informed urgently in a case where an error occurs during operation, so that a processing to send a message or email containing error contents to the account of the user who made login for work of this time at the multi-function peripheral 101. The workflows A to C are defined at the workflow 152 for each application section, and the workflow D is defined at the workflow 153 for error.

The following manipulations are made after defining the above workflows during operation of the image processing apparatus according to this embodiment. First, when the user selects the function for document management by pushing the DMS key 1204 from the control panel 103 of the multi-function peripheral 101, the multi-function peripheral 101 displays a screen for entering the user ID and password as shown in FIG. 16 at the manipulation display of the control panel 103 and at the liquid crystal touch panel 1210 for making designation to verify the user using the server PC 120, and waits for user's manipulation.

Figure 16:
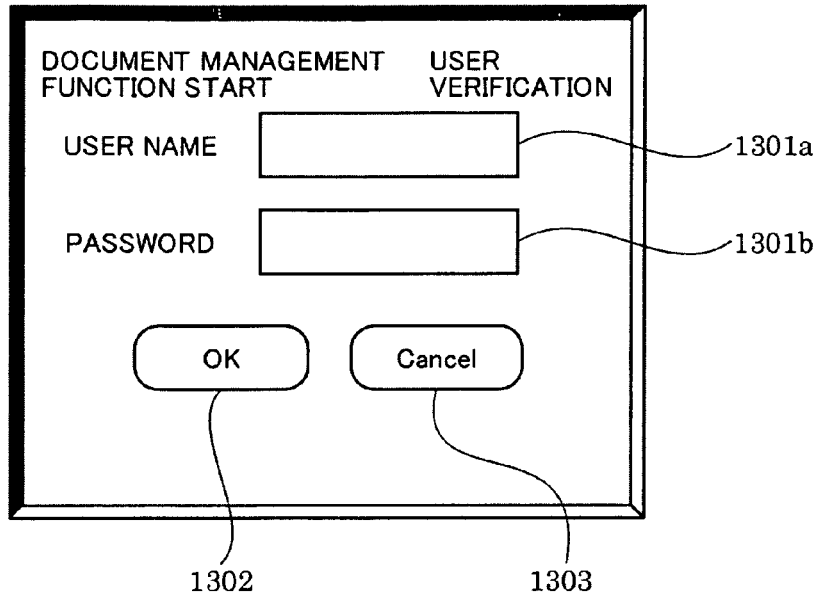
FIG. 16 is an illustration showing a user verification entry screen of the image processing apparatus according to the first embodiment of the invention.
Figure 17:
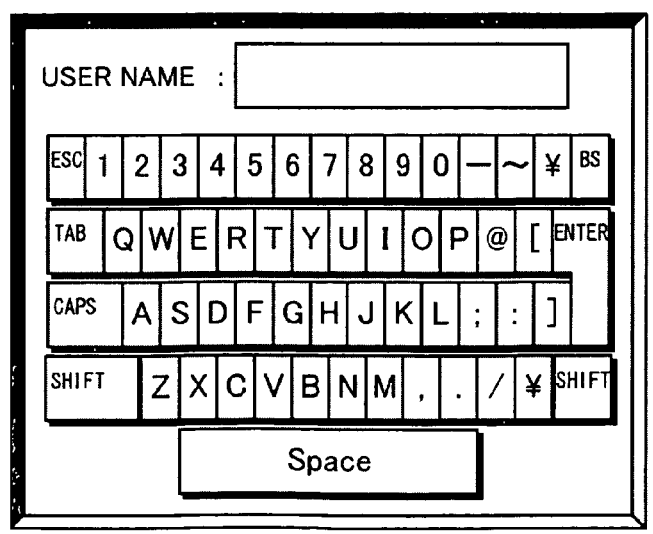
FIG. 17 is an illustration showing a user name string entry screen of the image processing apparatus according to the first embodiment of the invention.

When entering the user name and the password, the user can enter those data with the ten key 1223 in FIG. 15 to an entry box 1301a for user name and an entry box 1301b for password in FIG. 16. A screen for entering strings as shown in FIG. 17 can be displayed by touching the entry box 1301a for user name and an entry box 1301b for password, thereby rendering the user enter data by selecting letters from the illustration of the displayed keyboard.

When the user enters the user ID and the password from the control panel 103 as described above and executes the user verification by touching the OK button 1302, the web service client 102 executes a service using the user ID and the password entered previously as argument to verify the user for the web service unit 121 of the server PC 120. The service can be made using secure protocols such as, e.g., https using SSL at that time because the user ID and the password are required to be protected for security purpose.

The web service unit 121 transfers the user ID and the password to the user verification unit 122, thereby performing the user verification. Although this embodiment does not describe details of the method of the user verification, verification by directory services, local user verification in the server PC 120, or other verification methods can be used. The web service unit 121 returns the result to the web service client 102 upon completion of the user verification.

Figure 18:
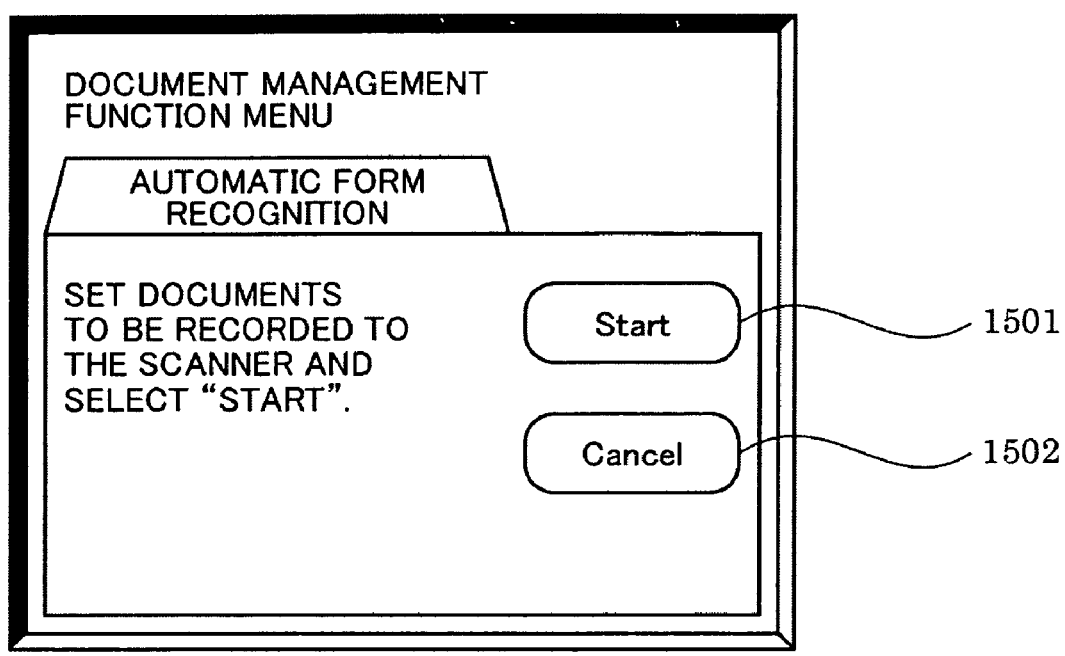
FIG. 18 is an illustration showing a user verification entry screen of the image processing apparatus according to the first embodiment of the invention.

The web service client 102 displays a document management function menu as shown in FIG. 18 on the control panel 103 via the panel controlling unit 104 upon succeeding the user verification, and waits for user's manipulation. The user sets the form groups to be read in a plural number, and selects reading start by touching the start button 1501 of the document management function menu on the control panel 103 or by pushing the start key 1224 shown in FIG. 15 on the control panel 103.

The web service client 102 calls a form reading service of the web service unit 121 of the server PC 120, and the form reading service of the web service unit 121 executes image reading service 107 of the multi-function peripheral 101 and reads the document from the scanner 105 via the image reading controlling unit 106. The read data are transmitted to the server PC 120 as image data of one set image group serving as a form group read at one time and are saved in the read image storing unit 125. In this embodiment, because the server PC 120 and the server PC 120 are connected to the network, the document image data read at the scanner 105 are saved in a shared folder defined in advance in the server PC 120 by operation of the image reading service 107 of the multi-function peripheral 101 as a file with a file name produced according to a naming rule determined in advance.

The form reading service of the web service unit 121 renders the document extraction classification processing unit 123 recognize the entire pages of the image group of one set saved in the reading image file unit 125 sequentially from the first page at the form recognition OCR unit 130, extract and classify the document, and produce the document information table 124 including the position of the page image and the state of the application section of each Form of the respective documents. The position of the particular page image in the one set of the image group is indicated with the number increasing one by one in a way that a first page is set for the top page, or a first read page image of the original document, that a second page is set for a second read page image of the original document, and that a third page is set for a third read page image of the original document, and those numbers are called as page numbers. The form recognition OCR unit 130 judges a form closest to the form feature data saved in the form definition profile unit 131, and identifies data based on the attributes and regions designated by the region recognition information in relation to the closest form.

In a case where the types of the form are recognized as Forms 1 to 4 according to the result of the form recognition, the document identification number is obtained because the document identification number is recognized with the form recognition OCR unit 130 based on the attributes and regions designated by the region recognition information. Where the type of the form is recognized as Form 1, mark information of this application section is retrieved because the mark information of the application section is recognized with the form recognition OCR unit 130 based on the attributes and regions designated by the region recognition information.

The position of the page image and the state of the application section of each Form of the respective documents are stored in the document information table 124 according to the result of recognition done at the form recognition OCR unit 130. The document identification number and the page number indicating the currently processed page image as position information of the currently processed page image at a location shown according to the types of the form or namely Form, are stored in the document information table 124. Where the type of the form is Form 1, check information of the application section of the location is stored in the document information table 124. It is to be noted that the document identification number, the page number, and the mark information of the application section are forming a first image containing the setting information on the processing to be set, and is processed as including the setting information for processing for the second image.

Figure 4:
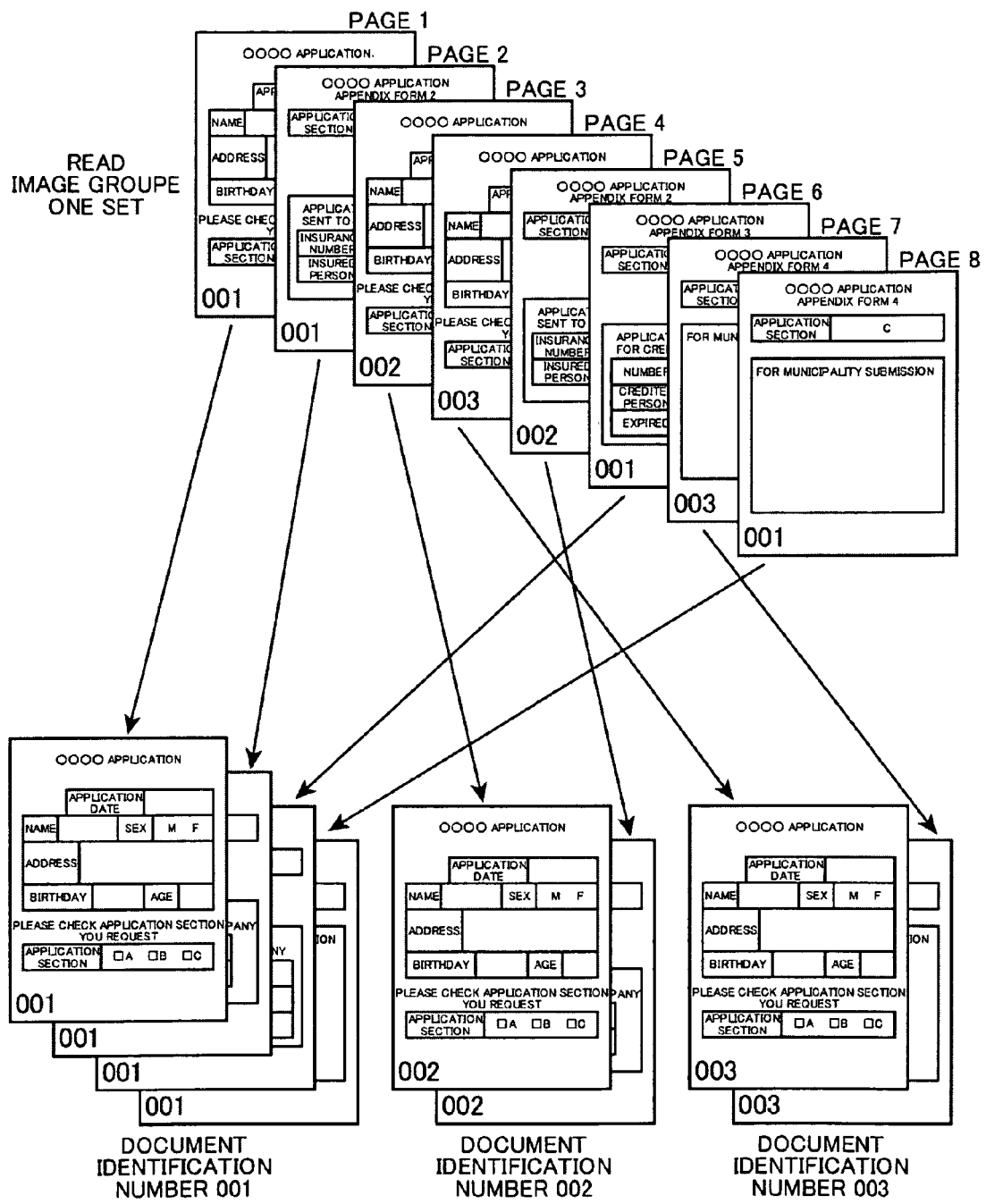
FIG. 4 is a schematic diagram showing an example of document information table production processing by document extraction classification processing at the image processing apparatus according to the first embodiment of the invention.

FIG. 4 shows an example of the data producing processing of the document information table 124 done by the document extraction classification unit 123. In a case that the result of the form recognition is that no form exists, a service of the workflow service unit is made to operate as of misrecognition, and an error processing is executed by executing the workflow for error processing defined at the error workflow 153. It is to be noted that the page number zero (0) means that no corresponding page exists in the document information table in FIG. 4.

After the document extraction classification processing is completed for the entire pages of one set of the image group serving as the form group read continuously at a time, the page number value of Form corresponding to the application section is checked with respect to each extracted document as to whether the page of Form corresponding to the application section exists or not, by the data in the document information table 124. If the page number is zero, there is no necessary page for application, and the service of the workflow service unit 150 is made to operate to inform this situation, thereby executing the error processing by executing the workflow of the error processing defined at the error workflow 153.

If a page or pages necessary for application exist, a page image or images of the page number necessary for application saved in the document information table 124 are extracted out of the image data of the one set of the image group saved in the read image storing unit 125, are combined into one file. The combined file is saved in the document library corresponding to the application section produced in advance in the database using the document management service unit 140, thereby executing the workflow defined in advance for application section upon operating the workflow service 150.

If an error occurs during the process, the erroneous image data file is saved in the document library for error produced in advance in the database 142 using the document management service unit 140, thereby executing the workflow for error defined in advance in the error workflow 153 upon operating the service of the workflow service unit 150.

Figure 5:
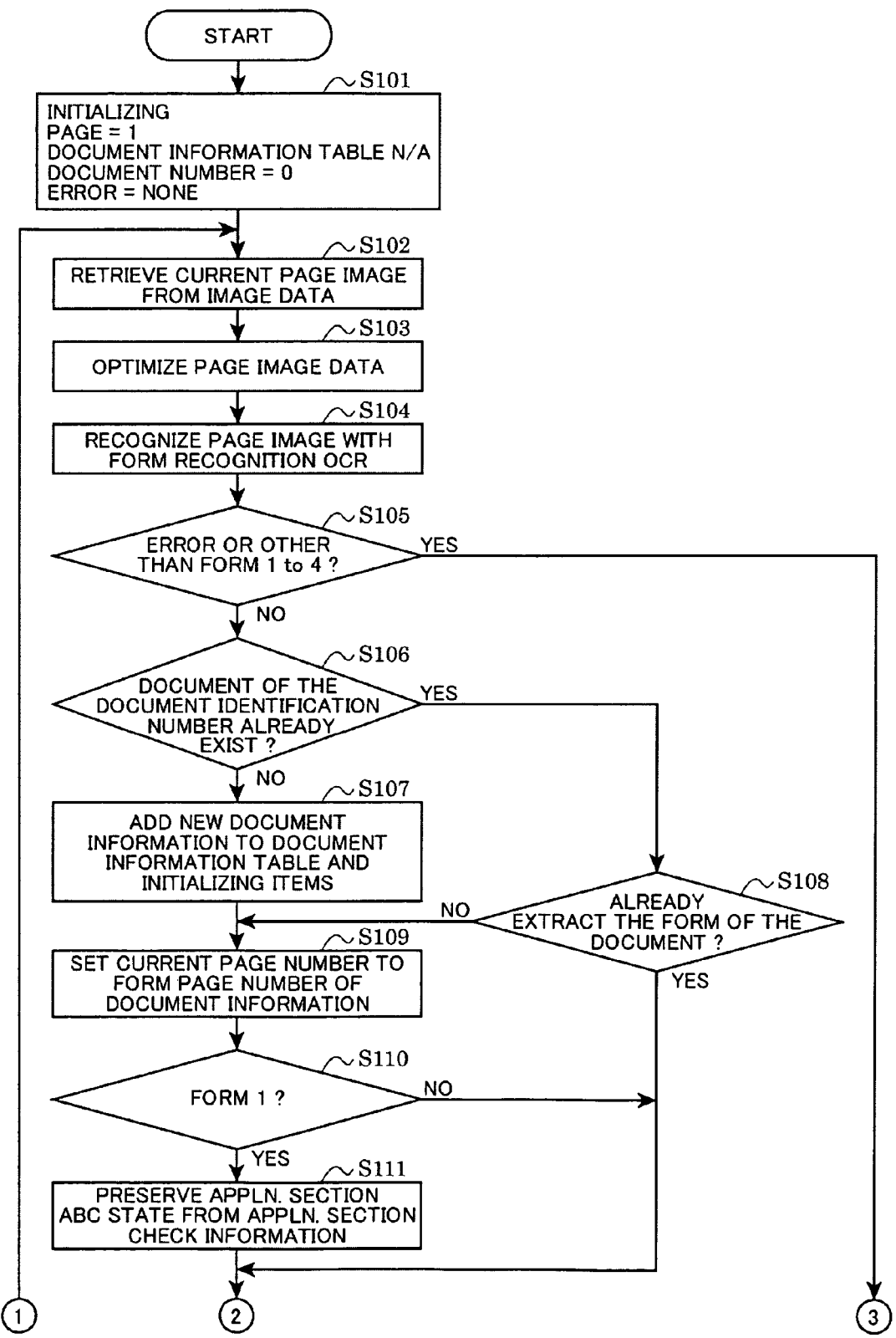
FIG. 5 is a flowchart of a workflow execution processing from form recognition done at the image processing apparatus according to the first embodiment of the invention.
Figure 6:
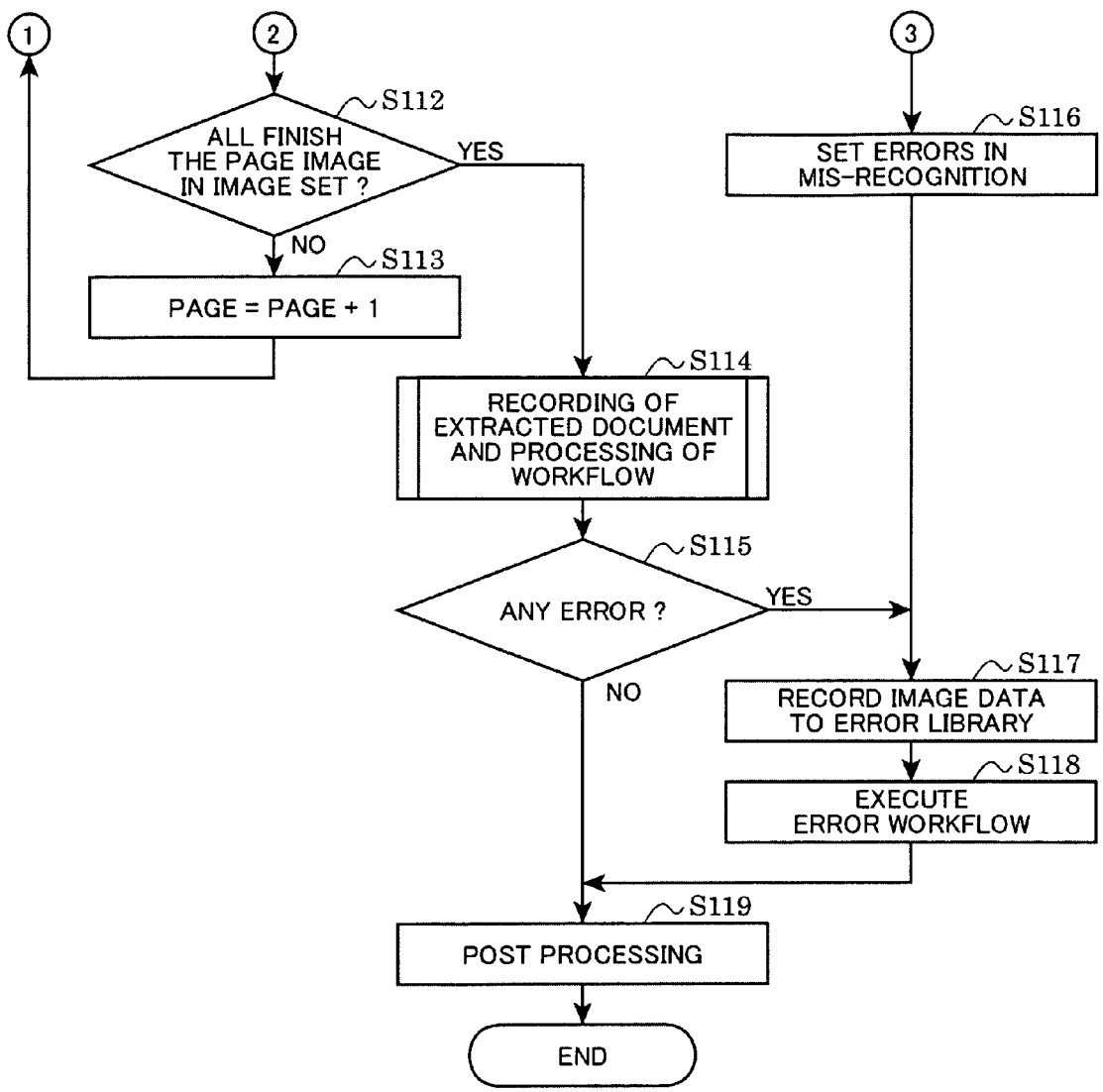
FIG. 6 is a flowchart of a workflow execution processing from form recognition done at the image processing apparatus according to the first embodiment of the invention as a flowchart of a flow subsequent to the flow in FIG. 5.

Referring to FIGS. 5, 6, processes for recognizing read image data and for executing workflows are described using a flowchart from the form recognition to the workflow execution processing as described above.

First, the system is initialized. At step S101, the page number during the processing is initialized to one; the document information table is initialized to "none"; the number of document is initialized to zero; and the error is initialized to "none." The apparatus at this stage is deemed as in a reset state, and can execute, e.g., form recognition.

The current page image of the image data read at step S102 is cut out after this initialization. In a case where the images of plural pages are contained in one file, images in the file are extracted. Where one page makes one image, images are extracted from the file containing the image in the current page. After this cutting out operation, the page image data taken out at step S102 are optimized in a format recognizable at the form recognition OCR unit 130 (at step S103).

The form definition profile 131 and the page image optimized at step S103 are designated at the form recognition OCR portion 130 to recognize the page image (step S104). At the time of processing at the form recognition OCR portion 130, the document identification number containing setting information for processing to be set and the portion of the mark information at the portion of the application section are read as the first image, and images of the respective pages containing information processed according to Form read as the second image, as well. Where the form is identified during recognition, the document identification number and the portion of the mark information of the application section portion are recognized based on the region designated with the region recognition information and the attributes.

After the recognition of the page images at step S104, a judgment is made as to whether any error occurs as the result of the recognition and as to whether the page image is other than Form 1 to Form 4 (step S105). If it is judged so, the program proceeds to step S116, and if it is judged other than the above situations, the program proceeds to step S106. A processing for setting error as misrecognition error is made at step S116, and the program proceeds to step S117 at which the image data are recorded in the error library.

If there is no error or the like at step S105, the program proceeds to step S106 to confirm as to whether a document having the same identification number as the identification number recognized at a time that the form recognition OCR portion 130 identifies the page image is already recorded in the document information table. If the document is already recorded in the document information table, the program proceeds to step S108, and if the document is not recorded yet, the program proceeds to step S107. First, in a case where the document identification number is not yet recorded, document information of a new document identification number is added to the document information table; the document identification number is set; zero is set to the page number of respective Forms; each application section is made with no check mark; and one is added to the document number.

Subsequently, at step S109, the current page number in processing is set to the page number corresponding to Form recognized at step S104 of the document information having the corresponding document identification number in the document information table (see FIG. 4). A judgment is made as to whether Form recognized at step S104 is Form 1 including mark information of the document identification application sections A, B, and C (step S110) after the page setting. If it is Form 1, the program proceeds to step S111, and if it is other than Form 1, the program proceeds to step S112. The states of the application sections A, B, C are determined from the mark information of the document identification application sections A, B, and C recognized at step S104, and the states of the application sections A, B, and C of the document information having the corresponding document identification number in the document information table are set.

In a case where the document identification number is already recorded in the document information table at step S106, the program proceeds to step S108, and the page number corresponding to Form recognized at step S104 is retrieved from the document information having the corresponding document identification number in the document information table at step S108, thereby judging as to whether that Form is already extracted. If the page number is zero, the page of the Form is not yet extracted, so that the program proceeds to step S109 and further to a step at which the current page number is set (step S109) and to a step at which the states of the application sections is determined from the mark information of the application sections A, B, and C (step S112). If the page number is other than zero, the page of that Form is already extracted, and the program proceeds to step S112 to avoid repeating, thereby omitting proceeding to the step at which the current page number is set (step S109) and to the step at which the states of the application sections are determined from the mark information of the application sections A, B, and C (step S112).

With steps from S105 to S111, the recognition processing of Form on the pages currently processed is completed. That is, in a case of Form 1, the mark information of the application sections A, B, and C and the page number are recognized in addition to the document identification number, and in a case of other Forms, the page number is recognized in addition to the document identification number. Where the recognition processing of Form of the page currently processed is completed, the entire page images in the one set of the read images are processed, and a judgment is made as to whether a subsequent page exists (step S112). If the subsequent page exists, the program proceeds to step S113 and reruns to step S102 again after renewing the page number in adding one to the page number. If no subsequent page exists, the program proceeds to step S114.

Recording to the application sections of the document extracted to the document information table, as described below, and a workflow processing are executed at step S114. If any error occurs in the process at step S114 (S115), the program proceeds to step S117. If no error occurs, the program proceeds to post-processing at step S119. Steps S117, S118 are processes at a time of error occurrence, and image data are recorded in the error library (S117), and an error processing corresponding to preset errors is performed (step S118) by executing the workflow for error processing defined at the error workflow 153 upon operating the workflow service 150. Finally, a memory used is released as the post processing at step S119, and an event log relating to the processing result is produced. Then, the process is completed.

Figure 7:
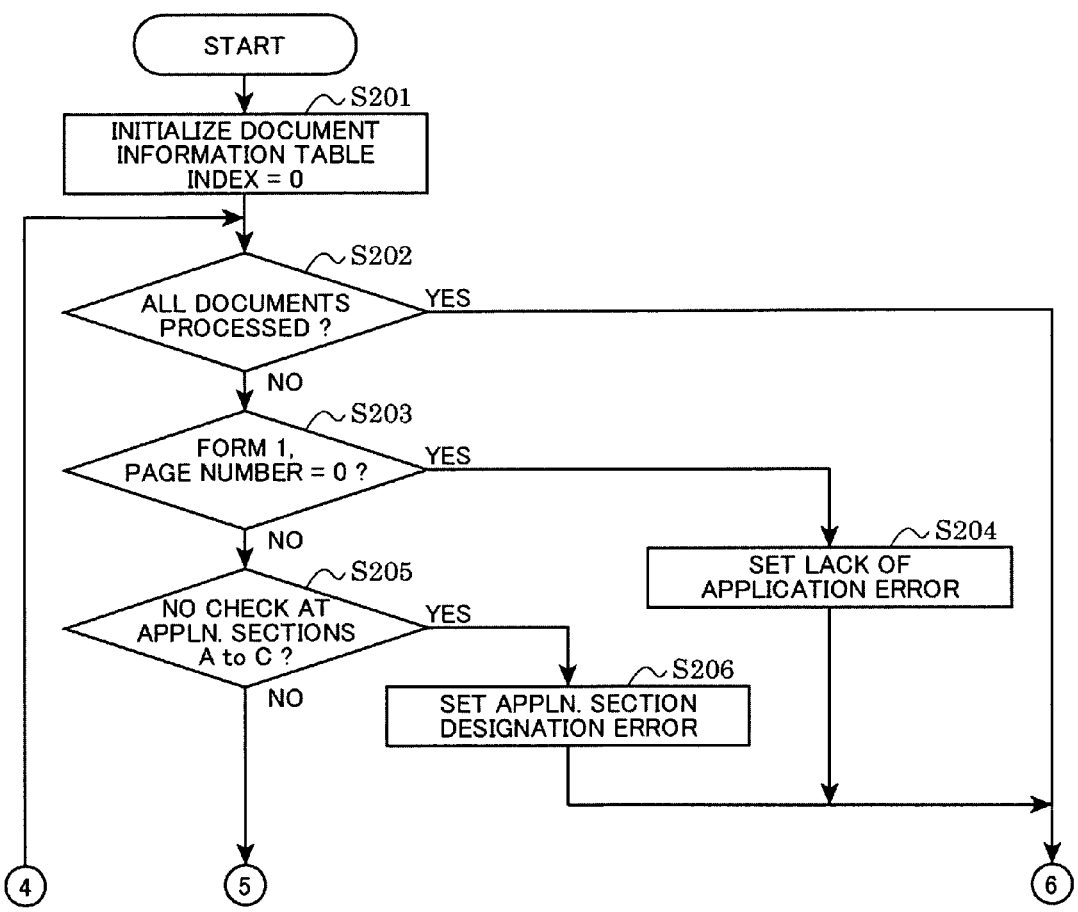
FIG. 7 is a flowchart of registration and workflow processing of an extracted document done at the image processing apparatus according to the first embodiment of the invention.
Figure 8:
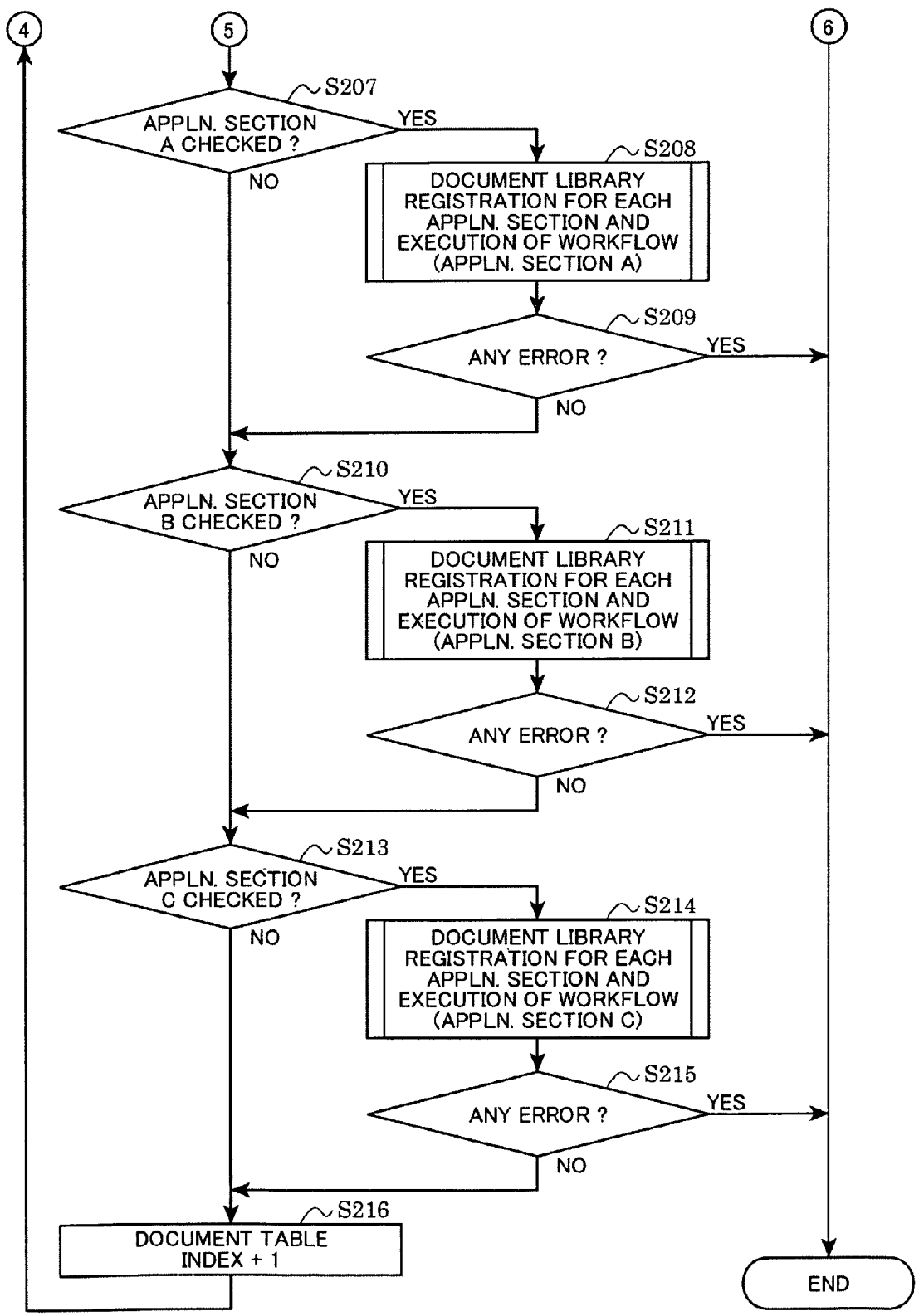
FIG. 8 is a flowchart of registration and workflow processing of an extracted document done at the image processing apparatus according to the first embodiment of the invention as a flowchart of a flow subsequent to the flow in FIG. 7.

The description above is for the flowchart performing the document extraction classification processing on the entire pages of the one set of the image group serving as form group continuously read at one time and executing the prescribed processes. Now, using flowcharts shown in FIGS. 7, 8, a registration to the application sections for the entire pages of the one set of the image group thus already classified, a registration of the document extracting a workflow processing, and a workflow processing are described. It is to be noted that the registration to the application sections, the registration of the document extracting the workflow processing, and the workflow processing are corresponding to the processing at step S114 in the flowchart previously shown in FIG. 6.

An initial value zero (0) is set to value Index to be referred of the document information table at step S201. The value Index corresponds to a column number of the document information table to be referred, and increases one by one to refer respective items of the document information table sequentially. The document number and the value Index to be referred of the document information table are compared to each other, and if the document number becomes smaller than the value Index to be referred of the document information table by gradual increment of the value Index, the entire documents come to be completed for processing, thereby ending processing.

In a case where the entire documents are not yet completed at step S202 (No), the program proceeds to step S203, and the page number of Form 1 of the currently processed document is confirmed upon rendering the document indicated with the value Index of the document information table converted to the currently processed document. If the page number is zero (0), the program proceeds to step S204 because it is ruled as no page of Form 1 as a basis of the document for such as, e.g., the application section exists. In a case other than that, the program proceeds to step S205. Because there is no page serving as the basis of the document at step S204, error of lack of the application is set to the error information, and ends the program.

A confirmation is made at step S205 as to whether any check is given to the application sections A, B, and C of the currently processed document, and if no check is given, it is judged as failure of filling in the application sections, thereby ending the program upon proceeding to step S206 and setting an application section designation error to the error information. In a case other than the above case, the program proceeds to step S207.

A confirmation is made at step S207 as to whether a check mark is given to the application section A of the currently processed document, and if the check mark is given, the program proceeds to step S208 and performs registration at the document library of the application section A, or namely application section of "Form 2," and workflow processing (step S208). If an error occurs during the processing at step S208, the processing is ended, and if no error occurs, the program proceeds to step S210. If no check mark is given to the application section A of the currently processed document at step S207, the program proceeds to step S210.

A confirmation is made at step S210 as to whether a check mark is given to the application section B of the currently processed document, and if the check mark is given, the program proceeds to step S211 and performs registration at the document library of the application section B, or namely application section of "Form 3," and workflow processing (step S211). If an error occurs during the processing at step S211, the processing is ended, and if no error occurs, the program proceeds to step S213. If no check mark is given to the application section B of the currently processed document at step S210, the program proceeds to step S213.

A confirmation is made at step S213 as to whether a check mark is given to the application section C of the currently processed document, and if the check mark is given, the program proceeds to step S214 and performs registration at the document library of the application section C, or namely application section of "Form 4," and workflow processing (step S214). If an error occurs during the processing at step S215, the processing is ended, and if no error occurs, the program proceeds to step S216. If no check mark is given to the application section C of the currently processed document at step S213, the program proceeds to step S216.

The value Index to be referred of the document information table is added by one at step S216, and the program returns to step S202 after this addition.

Figure 9:
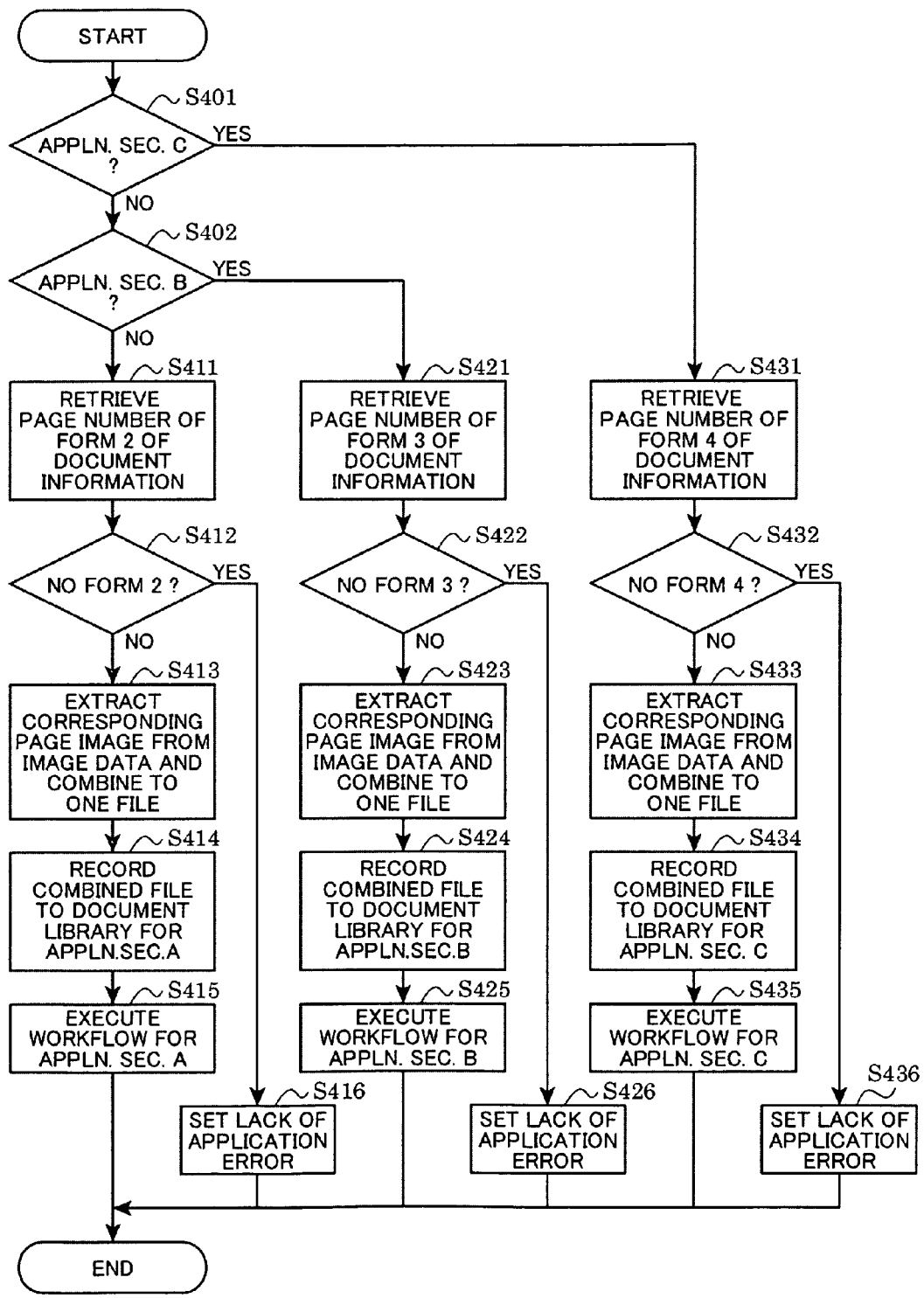
FIG. 9 is a flowchart of registration and workflow processing of document library for each application section in the image processing apparatus according to the first embodiment of the invention.

According to the steps described above, the workflow processing is made according to each application section for the entire pages of the one set of the image group already classified in the image processing apparatus according to this embodiment. Now, the registration of the document library of the application sections and the workflow processing at steps S208, S211, and S214 are described in detail with reference to a flowchart for the registration of the document library for each application section and the workflow execution processing shown in FIG. 9.

Where the application section is "C" at step S401, the program proceeds to step S431, and the application section is "B" at step S402, the program proceeds to step S421. If the application section is other than the above situations, the program proceeds to step S411. The steps S401, S402 indicate that the processing is shared according to the application sections, and from this view point, are having the same functions as those at steps S207, S210, and S213. The processing at step S208 in FIG. 8 therefore corresponds the processing at steps S411 to S416; the processing at step S211 in FIG. 8 therefore corresponds the processing at steps S421 to S426; the processing at step S214 in FIG. 8 therefore corresponds the processing at steps S431 to S436. In the flowchart in FIG. 9, the processing is separately described for each application section, but the processing contents are substantially the same among the steps S411 to S416, the steps S421 to S426, and the steps S431 to S436, so that steps S411 to S416 for application section A are representatively described below.

First, a page number of Form corresponding to the designated application section is retrieved from the currently processed document information in the document information table at step S411 (S421, S431). If the page number retrieved at the immediately previous step is zero (0) at step S412 (S422, S432), the program proceeds to step S416 (S426, S436) for error processing, because the page of the Form is not detected, or in other words, because no corresponding page of the Form exists. Because no page of Form necessary for the application section exists, an error of lack of the application is set at step S416 (S426, S436), and the program ends.

If a page of the Form is detected at step S412 (S422, S432), an image of the page indicated with a page number of Form 1 of the currently processed document information, retrieved from image data, and a page image data indicated with a page number of Form necessary for application processing for this time retrieved at step S411 (S421, S431) are extracted and combined into one file to form a document image necessary for application of the application section designated at next step S413 (S423, S433). The combined file is recorded to the document library for the application section using the document management service 140 (step S414, S424, S434). The workflow for the application section defined in the workflow 152 for each application section is then executed from the workflow service 150 at step S415 (S425, S435), and the program ends.

As described above, according to the image processing apparatus of the embodiment, the documents of plural types can be set continuously, so that work loads for setting paper by the operator or for providing instructions of operation start can be reduced, thereby reducing manipulations to designate the document types at the time of the operation start or occurrences of mistakes on designation of the document types, because the document types can be recognized automatically. According to the image processing apparatus of the embodiment, the workflow can be executed to the document of one set having the plural sheets, and human being's confirmation error can be reduced by displaying a warning to the operator, where any lack of pages is recognized in a document having one set made of plural sheets.

Second Embodiment

An image processing apparatus according to the second embodiment of the invention has a feature to read a document formed with plural pages and to execute an appropriate workflow in association with the document from the format of the document set forth in the first page and from operation information of the workflow. The structure of the image processing apparatus according to the second embodiment is substantially the same as that of the previous embodiment and has the structure shown in FIG. 1, and the same reference numbers are used in this embodiment. In this embodiment, an image processing apparatus in which a request of the prescribed Form is set to the first page and the second or later pages are arbitrary is exemplified to describe the operation.

A request of Form 5 as shown in FIG. 10 is set to the first page, and second or later pages are made arbitrary. It is to be noted that the image information of the first page includes information for setting of a workflow for the second and later pages. The sheet type of Form 5 is indicated with a code (e.g., ABC00123) set forth in a portion of a region 801 of the sheet type identification number surrounded with a broken line in FIG. 10. The code can be printed in advance, and the requestor can write by his hand. The second and later pages can be made with any format.

Figure 11:
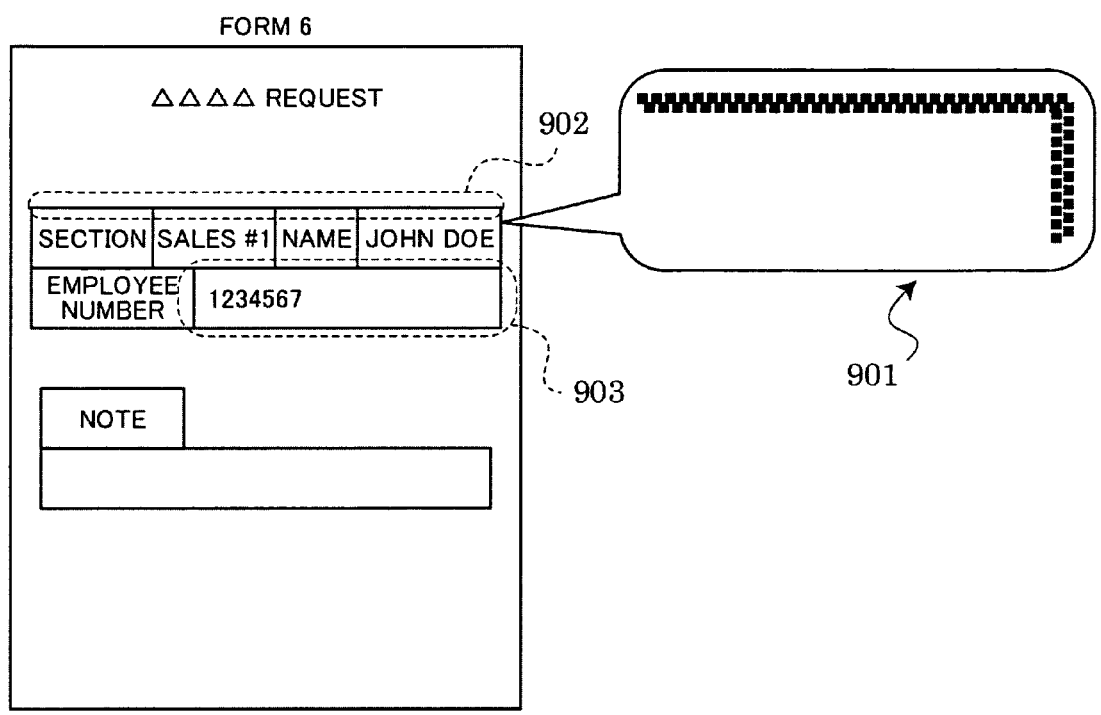
FIG. 11 is an illustration showing an example of a document disposing a form type ID in a bar code of a line in the image processing apparatus according to the second embodiment of the invention.

Alternatively, without using the sheet type identification number codified as in Form 5, a sheet can be used in which the sheet type identification number can be codified as shown in FIG. 11 and in which the code is aligned as a barcode in the line portion 902. In addition, a paper can be produced and printed in advance in which information such as sheet type identification number and employee number is codified and embedded in a pattern in a background 905 as shown by Form 7 in FIG. 12, and be used for the first page. Although in this embodiment the workflow is executed according to the sheet type of the first page, a user indicated with the employee number set forth in the first page is added as an addressee of the notice of the workflow process, and the workflow state can be notified to a requester other than the operator.

In operation of this embodiment, the following works are to be done at the server PC 120 prior to the operation by the users. First, features of each page of each Form in documents without filling any content as a basis of the documents recognized during operation as shown by Forms 5, 6, 7 shown in FIGS. 10, 11, 12, respectively are extracted at the form utility unit 132, and are saved in the form profile unit 131 together with the name of the form and the attributes for recognizing the form.

Figure 12:
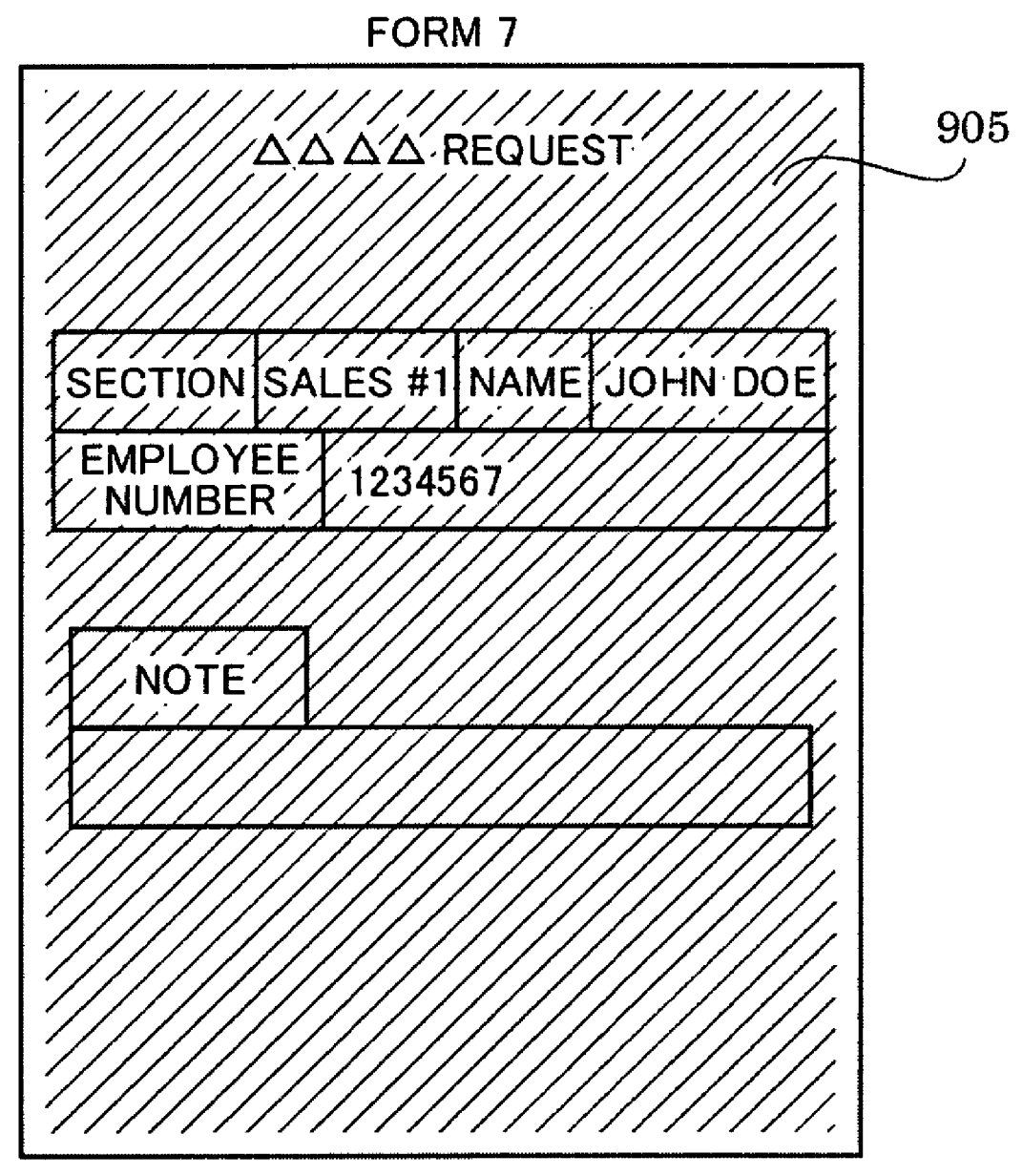

With respect to Form 5, letters at the portion of the form identification number 801 are read for recognition of the form, and it is ruled to recognize the form as indicated with the identification number set forth in the portion. A rectangle of a region 802 in FIG. 10 is defined as region recognition information for an employee number string. With respect to Form 6, lines in a portion of the line region 902 shown in FIG. 11 are read for recognition of the form, and it is ruled to recognize the form as indicated with the form identification number 901 retrieved from the barcode arranged as the line. A rectangle of a region 903 in FIG. 11 is defined as region recognition information for an employee number string. With respect to Form 7, a form identification number retrieved from a pattern of the background 905 shown in FIG. 12 is read for recognition of the form, and the pattern of the background 905 including an employee number string is defined as region recognition information.

Second, the document library for saving the documents is produced using the document management service unit 140. The produced document library includes a document saving library corresponding to the sheet type identification number and a library for error. The document library in fact is produced in the database 142 via the database service unit 141.

Third, the workflow according to the sheet type identification number and the workflow for error are defined. In this embodiment, a workflow for approval is defined in advance, and is saved in relation with the document saving library corresponding to the sheet type identification number. The workflow for approval includes the steps of requesting an application of the document to a requesting management department according to the sheet type after approval of the supervisor of the operator, and informing the completion of the request to the operator as the requested person and the requestor turned out from the employee number after completion of the request. A notice that could not be made in the error workflow is sent to the operator.

After a preliminary setting as described above is made, the following manipulations are done during the operation of the image processing apparatus according to the second embodiment. First, the user selects a menu start for document management from the control panel 103 of the multi-function peripheral 101, and the multi-function peripheral 101 displays a screen to enter the user identification number and password for rendering the server PC 120 verify the user to wait for user's manipulation.

When the user enters the user identification number and the password from the control panel 103 and executes those data, the web service client 102 executes the service using the previously entered user identification number and the password as the argument for user verification at the web service unit 121 of the server PC 120. Because the user identification number and the password are required to be protected in terms of security, the service is made using a secure protocol such as, e.g., https using SLL.

The web service unit 121 transmits the user identification number and the password to the user verification unit 122, thereby verifying the user. In this embodiment, details of the method for verifying users are omitted, but verification by the directory services or local user verification in the server PC can be used. Upon completion of the user verification, the result is retuned to the web service client 102 from the web service unit 121.

The web service client 102 displays the menu for document management on the control panel 103 via the panel controlling unit 104 upon success of the user verification and waits for user's manipulation. The user sets plural sheets of the document read by the scanner 105 and selects the reading start from the menu for document management on the control panel 103.

The web service client 102 calls the form reading service of the web service unit 121 of the server PC 120, and the form reading service of the web service unit 121 executes the service of the image reading service unit 107 of the multi-function peripheral 101, thereby reading the document with the scanner 105 via the image reading controlling unit 106 and transmitting the read data as image data to the server PC 120. In this embodiment, because the multi-function peripheral 101 and the server PC 120 are connected with the network, the document image data read at the scanner 105 are saved in a shared folder ruled in advance in the server PC 120 by operation of the image reading service 107 of the multi-function peripheral 101 as a file with a file name produced according to a naming rule determined in advance.

The form reading service of the web service unit 121 cuts out the first page of the read image data, optimizes the page image, and renders the c to recognize the page image to identify the type of the form. The form recognition OCR unit 130 judges a form closest to the form feature data saved in the form definition profile unit 131, and identifies data based on the attributes and regions designated by the region recognition information in relation to the closest form.

If the result of the form recognition is "Form 5," this information is retrieved because the form type identification number and the employee number are recognized based on the attributes and the region designated by the region recognition information with the form recognition OCR unit 130. If the result of the form recognition is "Form 6," this information is retrieved because the form type identification number arranged as a barcode in the line and the employee number read from the employee number portion are recognized based on the attributes and the region designated by the region recognition information with the form recognition OCR unit 130. If the result of the form recognition is "Form 7," this information is retrieved because the form type identification number embedded as a pattern in the background and the employee number are recognized based on the attributes and the region designated by the region recognition information with the form recognition OCR unit 130. If the result of the form recognition is other than Forms 5, 6, and 7, the error processing is made as an occurrence of misrecognition.

The second and later pages of the read image data are not subject to the recognition processing for page image in this embodiment. The page images are extracted as they are, from the image data, and are combined into one file. This file and the employee number recognized at the first page are made to be related and recorded in the document library corresponding to the form type identification number produced in advance at the database 142 using the document management service unit 140, and the workflow defined in advance for the form identification number is executed by operation of the workflow service unit 150.

With the workflow, permission for referring to the state of the workflow is given to the user of the employee number related to the document file as the receiver of the notice of the workflow processing, and the application result of the workflow is noticed to the user. If any error occurs during the recognition processing, the erroneous image data are saved as a file in the document library for error produced in advance at the database 142 using the document management service unit 140, and the workflow for error defined in advance is executed upon operation of the workflow service unit 150.

Figure 13:
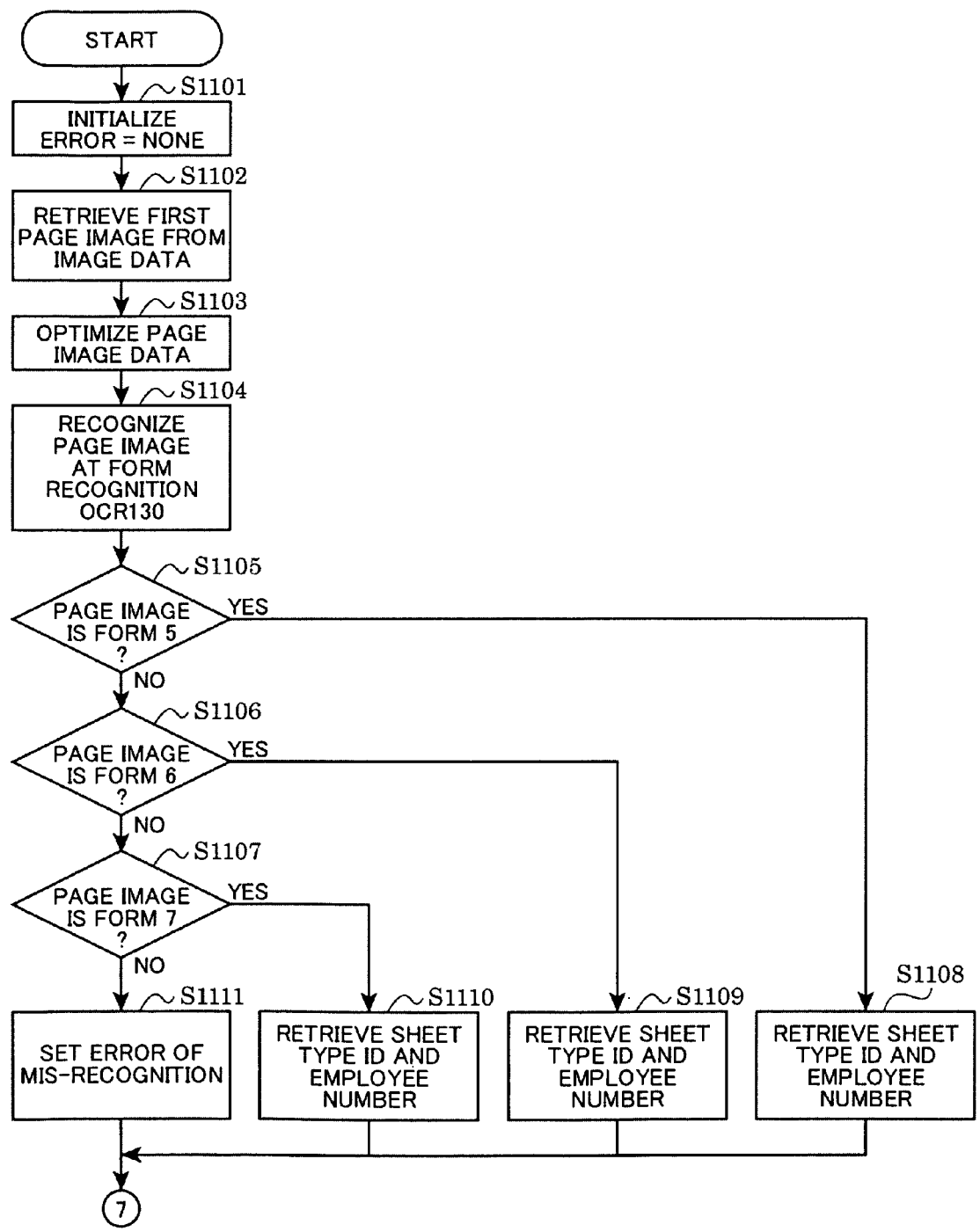
FIG. 13 is a flowchart of workflow execution processing from form recognition in the image processing apparatus according to the second embodiment of the invention.
Figure 14:
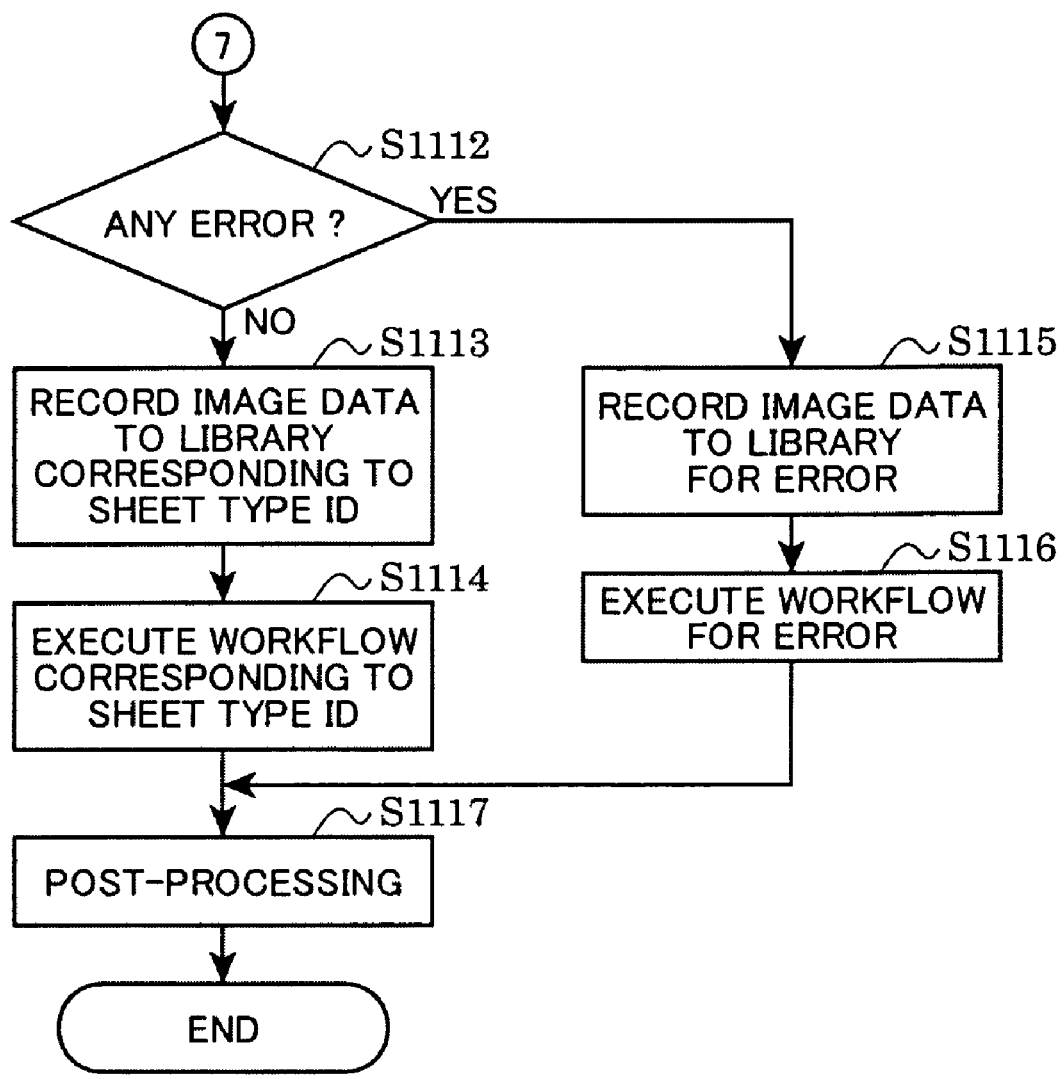
FIG. 14 is a flowchart of workflow execution processing from form recognition in the image processing apparatus according to the second embodiment of the invention as a flowchart of a flow subsequent to the flow in FIG. 13.

Processing from recognition of the read image data to execution of the workflow is described in reference to a flow-chart from recognition of form to workflow execution processing shown in FIGS. 13, 14.

First, the error, or error amount is initialized to "none" at step S1101. The first page of the read image data is cut out at step S1102. If the type is that one file contains plural page images, the images in the file are retrieved, and if one page contains one image, the image is retrieved from the file containing an image of the first page.

The page image data retrieved at step S1102 are optimized in a format recognizable to the form recognition OCR unit 130 at step 1103. After this optimization, the page images are identified by designating the form definition profile 131 and the page image optimized at the S1103 at the form recognition OCR unit 130 at step S1104. The form type identification number and the employee number are recognized based on the attributes and the region designated with the region recognition information if the form is specified during this recognition.

As a result of the recognition made at step S1104, if the page image is "Form 5" at step S1105, the program proceeds to step S1108. As a result of the recognition made at step S1104, if the page image is "Form 6" at step S1106, the program proceeds to step S1109. As a result of the recognition made at step S1104, if the page image is "Form 7" at step S1107, the program proceeds to step S1110. If it is other than the above situations, the program proceeds to step S1111.

Because the form type identification number and the employee number are recognized based on the attributes and the region designated by the region recognition information for Form 5, this information is retrieved at step S1108, the program proceeds to step S1112. At step S1109, because the form type identification number arranged as the barcode in the line and the employee number read from the employee number portion are recognized based on the attributes and the region designated by the region recognition information for Form 6, this information is retrieved, the program proceeds to step S1112. At step S1110, because the form type identification number embedded as the pattern in the background and the employee number are recognized based on the attributes and the region designated by the region recognition information for Form 7, this information is retrieved, the program proceeds to step S1112. If the page image is not any of Forms 5 to 7, an error is set as the first page is not recognized as any of Forms 5 to 7 (step S1111).

An occurrence of any error is checked at step S1112, and if any error occurs, the program proceeds to step S1115. If no error occurs, the program proceeds to step S1113. The read image data is converted into a file at step S1113, and the file and the employee number recognized at the first page are related and recorded to the document library corresponding to the form type identification number produced in advance in the database 142 using the document management service unit 140. The workflow for error defined in advance for the form type identification number related to the document library recorded at step S1113 is executed upon operation of the workflow service unit 150 (step S1114), and permission for referring to the state of the workflow is given to the user of the employee number related to the document file at step S1113, thereby rendering the program proceed to step S1117. A memory used is released as the post processing at step S1117, and an event log relating to the processing result is produced.

As a result of checking as to whether any error occurs at step S1112, if any error occurs, the image data is registered at step S1115 to the library for error. Because it is required to urgently make a notice the error occurrence to the user in a case of such an error occurrence, a workflow for error is executed in which a message or email containing error contents to an account of the user who made a logon from the multi-function peripheral 101 for this operation, and an error processing is made corresponding to the preset errors.

According to the image processing apparatus of the embodiment, documents of plural types can be set continuously, thereby reducing work loads on the operator such as operator's setting paper and instructing start. The types of the documents can also be recognized automatically, thereby reducing loads on manipulations designating a form type at an instruction for start and reducing mistakes on designating a form type. According to the image processing apparatus of the embodiment, the workflow can be executed to a document of one set having plural sheets, so that manual manipulations can be omitted where the addressee or receiver of the notice of the workflow and referring permission of the workflow can dynamically be changed according to the document describing contents, and so that mistakes on manipulations or failure on manipulations can be reduced, respectively.

Although in the embodiments of the invention a combination of the server and the multi-function peripheral connected to the server via the network is used, the system can use a personal computer in lieu of the server. The device for reading image data can be a scanner or facsimile machine. The connection method can be a USB cable for connecting to a personal computer on a one to one basis. The multi-function peripheral can be a device or system directly connecting a scanner and a personal computer, which is further connected to a server via a network.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image processing apparatus for receiving a plurality of images corresponding to a plurality of document pages that includes a first page and following pages that follow the first page, saving the plurality of images, and executing image processing, said image processing apparatus comprising:

an inputting unit for inputting image data from the received images, reading setting information from the inputted image data and identifying document data from the inputted image data, the document data including first page data that corresponds to the first page and a plurality of units of form page data that corresponds to the following pages, wherein
the plurality of units of form page data includes second format information that indicates plural form types of the following pages,
the first page data includes first format information indicating expected form types, selected from among a plurality of predetermined form types, of the following pages;

an image recognizing unit for recognizing the first page data of the identified document data from the inputted image data and recognizing the first format information from the recognized first page data, the image recognizing unit for also recognizing the plurality of units of form page data and the second format information from the plurality of units of form page data; and a processing setting unit for judging, after said first and second format information are recognized, whether units of form page data that correspond to each member of the expected form types exist among the plurality of units of form page data by comparing the first format information with the second format information, and determining, based on a result of the judgment, processing for the inputted image data, wherein the inputted image data are processed based on the processing determined at the processing setting unit, and an error processing is performed when it is determined that no unit of form page data, that corresponds to one member of the expected form types, exists among the plurality of units of form page data by determining, based upon the comparison of the first format information with the second format information, that the first format information is different from the second format information.

2. The image processing apparatus according to claim 1, wherein the image recognizing unit is configured to perform a letter recognition processing.

3. The image processing apparatus according to claim 2, further comprising an image reading unit for reading the plurality of images, wherein
the inputted image data are produced at an external apparatus, and
the plurality of images are received through the image reading unit.

4. The image processing apparatus according to claim 1, wherein the image recognizing unit is configured to perform a mark recognition processing.

5. The image processing apparatus according to claim 1, wherein the image recognizing unit is configured to perform a bar code recognition processing.

6. The image processing apparatus according to claim 1, wherein the processing determined at the processing setting unit, is performed through a program selecting a plurality of processes.

7. The image processing apparatus according to claim 1, wherein the processing determined at the processing setting unit, is an approving processing.

8. The image processing apparatus according to claim 1, wherein the inputting unit reads the setting information according to a feature of an arrangement of a line or lines in a page of the received images.

9. The image processing apparatus according to claim 1, wherein the inputting unit reads the setting information by recognizing a combination of dots forming a line or lines in a page of the received images as a code.

10. The image processing apparatus according to claim 1, wherein the inputting unit reads the setting information by recognizing a letter formed at a prescribed position in a page of the received images.

11. The image processing apparatus according to claim 1, wherein the inputting unit reads the setting information by recognizing a bar code formed at a prescribed position in a page of the received images.

12. The image processing apparatus according to claim 1, wherein the inputting unit reads the setting information by recognizing a background pattern formed in a page of the received images.

13. The image processing apparatus according to claim 1, further comprising an image reading unit for reading the plurality of images from an original document, wherein the plurality of images are received through the image reading unit.

14. The image processing apparatus according to claim 1, further comprising a document management service unit for retrieving, when it is judged that units of the units of form page data that correspond to each member of the expected form types exist, particular units of the units of form page data that correspond to the expected form types from the inputted image data, combining the particular units of form page data and the recognized first page data into one file, and recording the combined file in a document library.

15. An image processing method for receiving, saving, and processing a plurality of images corresponding to a plurality of document pages that includes a first page and following pages that follow the first page, said image processing method comprising the steps of:

inputting, by an image processing apparatus, image data from the received images;

reading setting information from the inputted image data;

identifying, by an image processing apparatus, document data from the inputted image data, the document data including first page data that corresponds to the first page and a plurality of units of form page data that corresponds to the following pages, wherein the plurality of units of form page data includes second format information that indicates plural form types of the following pages, the first page data includes first format information indicating expected form types, selected from among a plurality of predetermined form types, of the following pages;

recognizing, by an image processing apparatus, the first page data of the identified document data from the inputted image data, and recognizing the first format information from the recognized first page data, the image recognizing unit for also recognizing the plurality of units of form page data and the second format information from the plurality of units of form page data;

judging whether units of form page data that includes each member of the expected form types exist among the plurality of units of form page data by comparing the first format information with the second format information;

determining, based on a result of the judgment, processing for the inputted image data;

processing the inputted image data based on the processing determined at the determining step; and performing an error processing when it is determined that no unit of form page data, that corresponds to one member of the expected form types, exists among the plurality of units of form page data by determining, based upon the comparison of the first format information with the second format information, that the first format information is different from the second format information.

16. The image processing method according to claim 15, further comprising:

retrieving, when it is judged that units of the units of form page data that correspond to each member of the expected form types exist, particular units of the units of form page data that correspond to the expected form types from the inputted image data;

combining the particular units of form page data and the recognized first page data into one file; and recording the combined file in a document library.

\* \* \* \* \*